United States Patent [19]

Michel

[11] 4,097,027
[45] Jun. 27, 1978

[54] DEVICE AND PROCESS FOR LIMITING SURFACE OXIDATION OF GLOWING HOT METAL DROSS

[75] Inventor: Jean Michel, Marly, Switzerland

[73] Assignee: Swiss Aluminium Ltd., Chippis, Switzerland

[21] Appl. No.: 740,421

[22] Filed: Nov. 10, 1976

[30] Foreign Application Priority Data

Nov. 21, 1975 Switzerland .................. 15102/75

[51] Int. Cl.² ........................................... C22B 21/00
[52] U.S. Cl. ..................................... 266/44; 266/256; 266/264
[58] Field of Search .................. 266/44, 256, 263, 264

[56] References Cited

U.S. PATENT DOCUMENTS

| | | | |
|---|---|---|---|
| 935,793 | 10/1909 | Kinnear | 266/264 |
| 2,803,449 | 8/1957 | Ludwig | 266/256 |
| 2,843,514 | 7/1958 | Kunz, Jr. | 266/256 X |
| 3,199,853 | 8/1965 | Olsen | 266/263 X |

Primary Examiner—Roy Lake
Assistant Examiner—Paul A. Bell
Attorney, Agent, or Firm—Ernest F. Marmorek

[57] ABSTRACT

A device limits the oxidation of the surface of hot metallic dross by preventing access of oxygen to the dross. The device includes a metal bell which is open at the bottom and can be moved vertically, a concrete base standing in a tank containing water and a shallow container for holding the dross. The bell includes a number of metallic supports projecting from its lower edge to support the bell as it rests in the water filled tank. This arrangement provides an air-tight seal for the space inside the bell and allows for compensation of any pressure change inside the bell as the hot dross consumes the limited amount of oxygen in the air 3 Claims, 1 Drawing Figure

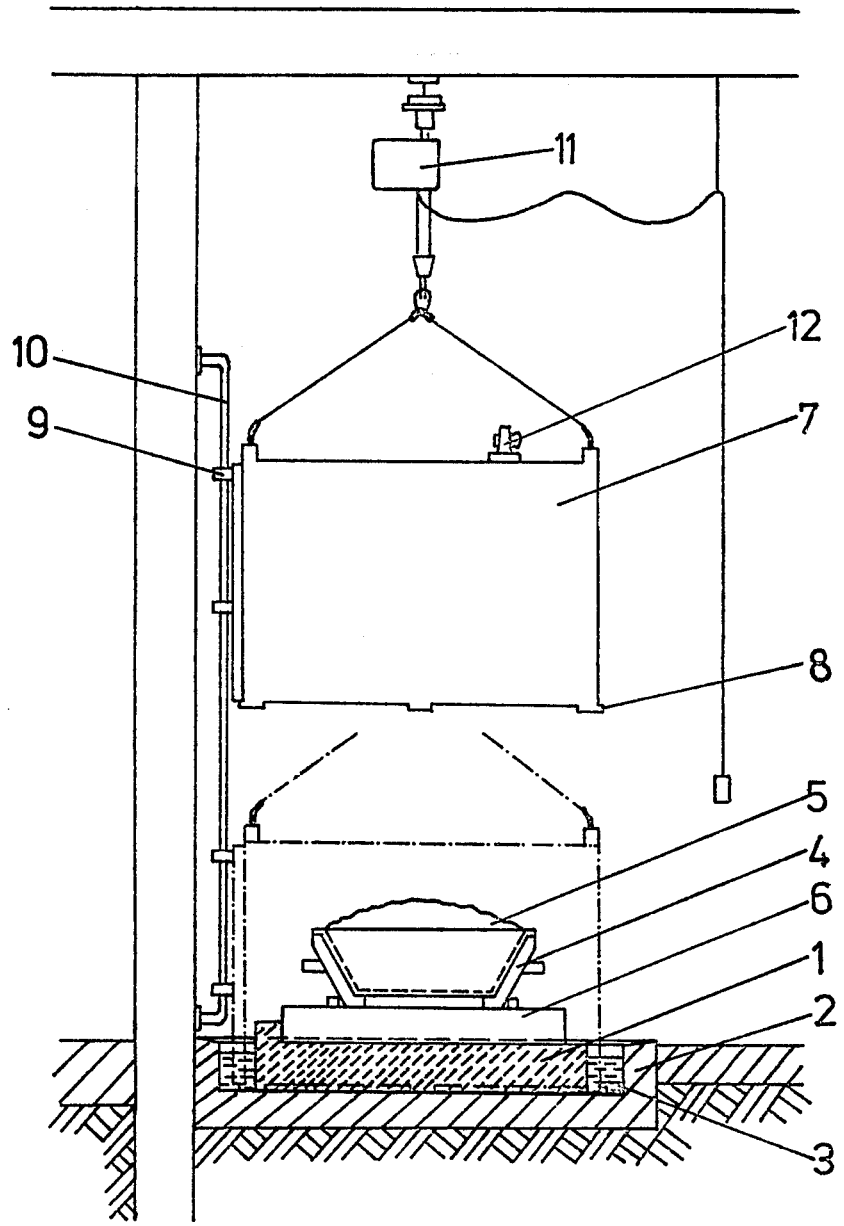

DEVICE AND PROCESS FOR LIMITING SURFACE OXIDATION OF GLOWING HOT METAL DROSS

BACKGROUND OF THE INVENTION

The invention presented here concerns a device for limiting the surface oxidation of a glowing hot metal dross by preventing access of oxygen.

The control and limitation of oxidation reactions involving oxygen in the air, by means of suitable physical and chemical methods are generally denoted as quenching processes and are considerably more complicated with respect to materials, thermodynamics and kinetics than straight-forward oxidation reactions. In order to characterize the individual processes occurring, it is useful to separate theoretically the individual effect of each method which in principle prevents to a considerable degree oxidation conditions from being reached. The four so-called principal quenching effects are the dilution effect, cooling effect, smothering effect and the anticatalytic effect (L. SCHEICHL Brandlehre und chemischer Brandschutz, Z.A. Heidelberg 1958, p. 243).

Of these the smothering effect is the simplest and the longest known and utilised, and works by wholly or partially preventing the oxygen in the air from getting to the combustible material. This can be done by more or less surrounding the combustible material with a smothering agent in the form of a cloud of gas, vapor, mist or dust, and also depending on the circumstances as a crust or layer of foam (SCHEICHL, Idem. p. 247) or by enclosing the combustible material in a rigid gas-tight container. The last mentioned method is used on a large scale mainly for checking oil fires in the iron producing industry, where the following is prescribed viz. "to be provided for the oil container, lids which can be let down or closed immediately on igniting the contents, whereby the operation if necessary must be undertaken outside the room. In addition, the rooms/space must be fitted out with fire-fighting blankets" (Ernst v. Schwartz, Handbuch der Feuer- und Explosionsgefahr, 6 A Munich 1965 p. 296).

The smothering effect by means of rigid containers has however also found extensive application in other fields for checking oxidation processes, in particular where the spacial expansion of the combustible material is naturally limited and sealing off is therefore possible. Thus devices have been proposed for preventing the access of oxygen in the air in order to make incendiary bombs inactive (DT-PS 623 599, 647 893), to smother burning gases and to limit fires in disposal pits.

The prior art is also such that it is known to be particularly appropriate to provide a pneumatic vessel for experiments in which gaesous materials are used and the volume of which changes during the experiment. In such a case the gases are stored in a container which has its open end facing downwards into a container holding a suitable liquid (usually mercury or water). If the volume of gas changes either by the introduction of additional quantities or (as with air and oxygen) because of oxidation processes occurring in the contained gas, or due to other reactions which decompose the gas chemically, then the difference in volume is compensated for by a corresponding displacement of the level of the liquid, and the gas-tight seal of the set-up remains intact.

An object of the invention presented here is to combine both a smothering effect and the pneumatic vessel and thus to provide a process for limiting oxidation reactions which occur between oxygen in the air and a glowing hot metallic dross. The term "dross" here covers combustion products, in particular insoluble oxides of the basic materials and their alloy constituents used in the foundry, which lie on the surface of the melt on melting non-ferrous metals in normal atmospheres (LUEGER, Lexikon der Technik, 4. A. 1963, volume 5, p. 334). Immediately before casting, this dross is mechanically removed from the surface of the melt since, in order to obtain sound castings, no such dross may enter the mould. In order to achieve effective mechanical separation, usually an agent is added to make the dross cohesive and viscous or even solid, and therefore more easily removeable. The skimmed-off dross is retained because of the high amount of valuable non ferrous metals and non-metallic oxides it contains. Because the dross is removed at the temperature of the melt, relatively strong oxidation reactions occur with the oxygen in the air, with the result that the amount of non-oxidized metal in the dross is lowered.

This oxidation reaction is undesireable from the point of view of further processing such dross, since the residual metal is separated from the oxides, the latter for expensive and energy-consuming reduction, and the metal for the relatively inexpensive re-melting process. Skimmed off dross containing relatively high concentrations of non-oxidized metal therefore fetches higher prices than highly oxidized materials on the market for recyclable materials.

Efforts in the treatment of dross have therefore up to now been concentrated on controlling the oxidation reaction between the glowing hot dross and the oxygen in the air, and to limit this as far as possible. The present state of the art towards this end employs two methods viz.

(1) The hot dross is spread over a steel sheet to shorten the combustion interval. This method makes use of the so-called cooling effect which is one of the four principal quenching effects, and consists of removing quickly the heat generated by the oxidation reaction and lowering quickly the temperature of the dross in order to reduce the speed of oxidation. The resultant increase in surface area of dross provides a larger area for reaction with the oxygen of the air, and therefore has an effect contrary to that which is desired and consequently the results of this method are unsatisfactory.

(2) In the other method the hot dross is covered with a dry powder (sodium hydrogen carbonate, chloride) to make use of the smothering effect, namely one version of this viz. the so-called displacement effect (mechanical separation of air and combustible material). The cooling effect due to the temperature difference between the hot dross and the cold powder is undoubtedly effective here too, but is less significant than the smothering effect. This method, however must also be considered to be only marginally successful because of important objections regarding working conditions and environmental pollution (development of irritating and poisonous fumes).

SUMMARY OF THE INVENTION

One of the principal objects of the invention is a device for limiting surface oxidation of glowing hot metallic dross by preventing access of oxygen, including, in combination, a metal bell having an open bottom and movable in a vertical direction, a container disposed below the bell for holding the dross, a base disposed below the container for the latter to rest on, and a tank which may at least partially be filled with liquid for receiving the base. The bell is formed with openings near the bottom thereof for providing communication channels for the liquid to pass therethrough upon the bell being placed into the tank.

The container is preferably shallow, and the bell is preferably provided with a plurality of holders on the outside thereof; a fixed, rigid vertical guide rail is provided for engaging the holders, as well as drive means for moving the bell along the guide rail in a vertical direction.

The device preferably includes a valve mounted on the bell for equalizing air pressure within the bell with the outside atmosphere.

The device advantageously includes liquid-supply means, including a float connected to the tank for keeping the liquid level in the tank constant.

The device is preferably provided with a plurality of supports, and the base is preferably a concrete base dimensioned so as to be placed on an ISO platform, as specified in document UDC 621.869, issued by ISO (International Organization for Standardization).

The bell is advantageously provided with a plurality of metallic supports which project from the bottom thereof to form the communication channels, and the liquid is preferably water.

Another principal object of the invention is a process for limiting surface oxidation of glowing hot metallic dross in an apparatus including a metal bell having a space formed therein and an open bottom, a container for holding the dross, a base for the container to rest on, and a tank filled with liquid for receiving the base, the bell being formed with openings near the bottom thereof for providing communication channels for the liquid to pass therethrough, the steps including placing the shallow container onto the base, lowering the metal bell over the dross, and sealing off the space formed within the bell from the outside atmosphere, so that additional oxygen is prevented from being supplied to the surface of the dross.

Atmospheric pressure prevails initially between the space of the bell, and the process preferably includes the steps of decreasing the atmospheric pressure within the space of the bell by the consumption or smothering of oxygen by the hot dross, so that the liquid level within the bell increases, and cooling the bell by the increased liquid level.

The process further advantageously includes the steps of selecting the quantity, temperature and surface area of the metallic dross in relation to the space of the bell for the smothering process to last approximately two hours.

BRIEF DESCRIPTION OF THE DRAWING

For a full understanding of the nature and object of the invention, reference should be made to the following detailed description, taken in connection with the accompanying drawing in which one version of the invention is illustrated diagrammatically in the sole figure of the drawing.

DESCRIPTION OF THE PREFERRED EMBODIMENTS

The device comprises a concrete base 1 which in size corresponds to an ISO transporting platform and stands in a tank 2 which is fixed into the ground and contains water 3, the level of which by suitable means, for example by a water supply conduit 14 and a float 13, is kept constant. The shallow container 4 which holds the dross 5, is placed on a metal platform 6 which is lowered by means of a suitable fork lift truck on to the space provided on the concrete base 1.

Above the concrete base there is provided a metal bell 7 which is releasably connected to a rigid, fixed, vertically-running guide rail 10 by means of a plurality of holders 9 on the outside wall of the bell 7. This metal bell can be displaced in the vertical direction by means of a lifting appliance 11.

The metal bell 7 is lowered over the glowing hot dross 5 in such a way that the resting points 8 stand in the water 3 in the tank 2, thus freely permitting the water inside and outside the bell to reach the same level. This way the dross is enclosed in a pneumatic tank, the space inside of which remains sealed off from the exterior in spite of the steadily reduced volume which results from the consumption of oxygen. The hot dross 5 is oxidised on the surface by the oxygen of the air in the bell, until combustion ceases due to lack of oxygen.

A small drop in pressure occurs in the bell 7 due to the reduction of the volume of gas; this pressure change is equalised by the rise in the water level inside the bell. If the height of the base 1 and the volume of the bell 7 are appropriately dimensioned, then the water 3 rises to the container 4 containing the dross 5 and can cool it somewhat. In order to ensure free access for the water 3 into the bell 7, the bell is provided with supports 8 at its lower edge. The smothering process lasts two to three hours. The bell 7 is provided on its uppermost side with a tap 12 which permits air to be admitted to equalise the pressure inside and outside. Without such a facility, equalising the water level and air pressure on raising the bell would take place with disturbing consequences.

Application of the technique of the invention in practice in an aluminum foundry allowed the concentration of metallic aluminum in the dross to be raised by 20 –30%.

What is claimed is:

1. A process for limiting surface oxidation of glowing hot metallic dross in an apparatus including a metal bell having a space formed therein and an open bottom, a container for holding the dross, a base for the container to rest on, and a tank filled with liquid for receiving the base, the bell being formed with openings near the bottom thereof for providing communication channels for the liquid to pass therethrough, the steps comprising:
    placing the shallow container onto said base,
    lowering the metal bell over said dross, and,
    sealing off the space formed within said bell from the outside atmosphere, whereby additional oxygen is prevented from being supplied to the surface of said dross.

2. A process according to claim 1, wherein atmospheric pressure prevails initially within the space of said bell and further comprising the steps of:
    decreasing the atmospheric pressure within the space of said bell by the consumption or smothering of oxygen by said hot dross, so that the liquid level within said bell increases, and
    cooling said bell by the increased liquid level.

3. A process according to claim 2 further comprising the steps of selecting the quantity, temperature and surface area of said metallic dross in relation to the space of said bell for the smothering process to last approximately two hours.

* * * * *